United States Patent [19]

Grisar et al.

[11] Patent Number: 5,778,383

[45] Date of Patent: Jul. 7, 1998

[54] SYSTEM FOR DYNAMICALLY CACHING AND CONSTRUCTING SOFTWARE RESOURCE TABLES

[75] Inventors: Caia Grisar, San Francisco; Tantek Celik, Cupertino; Jens Alfke, San Jose, all of Calif.

[73] Assignee: Apple Computer, Inc., Cupertino, Calif.

[21] Appl. No.: 512,327

[22] Filed: Aug. 8, 1995

[51] Int. Cl.$^6$ ..................................................... G06F 17/30
[52] U.S. Cl. .............................. 707/200; 707/102; 707/3; 711/3; 711/118
[58] Field of Search ............................ 395/600, 616; 707/100, 102, 200, 3; 711/3, 118

[56] References Cited

U.S. PATENT DOCUMENTS

| | | | |
|---|---|---|---|
| 4,819,154 | 4/1989 | Stiffler et al. | 364/200 |
| 5,151,989 | 9/1992 | Johnson et al. | 395/600 |
| 5,269,019 | 12/1993 | Peterson et al. | 395/600 |
| 5,363,487 | 11/1994 | Willman et al. | 395/275 |
| 5,390,318 | 2/1995 | Ramakrishnan et al. | 395/425 |
| 5,418,965 | 5/1995 | Mahar | 395/700 |
| 5,465,352 | 11/1995 | Nakazawa et al. | 707/3 |
| 5,530,829 | 6/1996 | Beardsley et al. | 711/113 |
| 5,577,224 | 11/1996 | DeWit et al. | 711/118 |

OTHER PUBLICATIONS

IBM Technical Disclosure Bulletin, vol. 38, No. 6, Jun., 1995, p. 151, "Distributed Computing Environment Application Enabler For OS/2 Cell Directory Client Cache".

IBM Technical Disclosure Bulletin, vol. 38, No. 1, Jan., 1995, pp. 409–410, "Graphical User Interface For The Distributed Computing Environment".

IBM Technical Disclosure Bulletin, vol. 37, No. 7, Jul., 1994, pp. 435–436, "Topology Database Of Managed Objects".

*Primary Examiner*—Thomas G. Black
*Assistant Examiner*—Greta L. Robinson
*Attorney, Agent, or Firm*—Burns, Doane, Swecker & Mathis, L.L.P.

[57] ABSTRACT

To expedite the run-time construction of resource table, cache files which contain relevant information needed to build a resource table are stored on associated storage media. When a program builds a resource table, all the information that is recorded in the table from a particular storage medium is also stored in a cache file that is kept on that medium. Included in the cache file is information pertaining to the most recent modification date for each folder or directory that contains a resource of interest. The next time that the table is built, the program compares the modification dates stored in the cache file with the actual modification dates of the folders or directories. If the folders and directories have not been updated since the last time the cache file was created, the information contained therein is loaded into the table. As such, the need to examine each file of interest and obtain the necessary data to record in the table is avoided, thereby substantially decreasing the time needed to build the table, and hence launch a program.

19 Claims, 4 Drawing Sheets

SYSTEM FOR DYNAMICALLY CACHING AND CONSTRUCTING SOFTWARE RESOURCE TABLES

FIELD OF THE INVENTION

The present invention is directed to the construction of tables which identify accessible resources in a computer system, and more particularly, to a method for dynamically constructing tables in a manner which reduces the time necessary to carry out these types of operations.

BACKGROUND OF THE INVENTION

As software programs become more complex and sophisticated, there is a growing tendency to utilize shared libraries of files and other resources. More particularly, many programs no longer operate as totally self-contained entities. Rather, some of the files that are utilized in the operation of a program may be shared with a number of other programs. As a result, these files may not all be stored in a central location. Rather, there is a distinct possibility that the various files to be accessed by a particular program may be stored in different folders or directories, and even on different storage media. Consequently, in order for a program to operate successfully, it must be aware of the existence and location of all files to which it must have access. To accomplish this objective, a table which identifies all of the various files, and other resources, is created and stored in the computer's main memory when the program initially launches. For example, upon start-up the program may search all accessible storage media to identify the files that it needs for operation, and record their location in the table.

Another environment in which it is desirable to construct resource tables is in the field of component-based software systems. An example of such a system is disclosed in U.S. patent application Ser. No. 08/175,549, filed Dec. 30, 1993 now abandoned. The particular system described in this application is a graphical user interface in which objects exist in the form of parts, where each part consists of intrinsic contents and an associated editor or handler. When a part is created or opened, an editor that is available on the computer system is bound to the part, to provide the necessary functionality that permits the user to manipulate the contents of the part. In order to perform the binding operation, the user interface must be aware of all of the available editors. Accordingly, when the user interface is launched, it conducts a search to locate all part editors, and stores relevant information pertaining to them in a table.

The construction of tables of this type is carried out in different manners. In some systems, the user is required to manually change the table whenever a file of interest is added to or removed from the computer. In other systems, the file is constructed automatically at run time by sequentially searching each accessible storage medium to locate files of interest. Typically, this task is carried out as the program which needs the files is launching. This procedure requires the program to go through the storage hierarchy of each medium and, as each file of interest is located, to examine the file and record the relevant information regarding that file in a table. While such a task may be relatively straightforward when a single storage medium, such as a local hard disk, is searched, it can be appreciated that the time required to complete the task can become significant if a variety of different media need to be searched, and can result in significant delays in the launching of a program on a computer. This concern is particularly true when the computer is connected to a network, in which the available resources could be spread over a large number of accessible storage media.

Accordingly, it is desirable to provide a mechanism which reduces the time necessary to search storage media for files of interest and build a run-time table which identifies the files.

SUMMARY OF THE INVENTION

In accordance with the present invention, this objective is achieved by storing cache files which contain the relevant information needed to build a resource table from a particular storage medium. For example, one cache file can be stored on each storage medium that is accessible to a software program of interest. When the program builds a resource table, all the information that is recorded in the table from a particular storage medium is also stored in a cache file that is kept on that medium. Included in the cache file is information pertaining to the most recent modification date for each folder or directory that contains a resource of interest. The next time that the table is built, the program compares the modification dates stored in the cache file with the actual modification dates of the folders or directories. If the folders and directories have not been updated since the last time the cache file was created, the cache file is up-to-date and the information contained therein can be simply loaded into the table. As such, the need to examine each file of interest and obtain the necessary data to record in the table is avoided, thereby substantially decreasing the time needed to build the table, and hence launch the program.

Further features of the invention, and the advantages offered thereby, are explained in detail hereinafter with reference to a preferred embodiment illustrated in the accompanying drawings.

DETAILED DESCRIPTION

To facilitate an understanding the principles which underlie the present invention, it is described hereinafter with reference to its implementation in the context of component-based graphical user interface, of the type described in the aforementioned application Ser. No. 08/175,549. It will be appreciated, however, that this exemplary embodiment is not the only practical application of the invention. Rather, the invention can be successfully utilized in any environment where it is necessary or desirable to build a table containing the identifications and locations of various files and other resources that are utilized in the operation of a program.

To briefly summarize, the component-based graphical user interface described in the previously mentioned patent application presents information to users in the form of objects that are known as parts. Each part is comprised of two main components, its contents, i.e., the data that makes up a document and is viewed by the user, and an editor which permits the user to manipulate that data. Whenever a user opens a part (for example, to create a document), an editor is bound to the part. For example, if the part is one whose contents are text, a suitable text editor is bound thereto. Similarly, if the contents of a part consists of graphics, a graphics editor, such as a drawing program, is bound to the part.

This binding operation is carried out by the graphical user interface. In order to perform such an operation, the user interface must be aware of the editors which are accessible by the computer on which the part is being opened. For instance, a text part may have been created on one computer utilizing a particular type of text editor. If that part is then transported to a different computer and opened, the user interface must determine whether the same text editor is available on the new computer. If it is, that text editor is bound to the part. If that particular text editor is not available, however, the user interface determines whether any other text editor is available which can be bound to the part. For further information regarding this binding operation, reference is made to copending, commonly assigned, U.S. patent application Ser. No. 08/204,520, filed Mar. 2, 1994 now abandoned.

Consequently, it is necessary for the user interface to have a mechanism by which it is aware of all available editors on the computer system. Typically, this mechanism is provided in the form of a table which identifies each editor, including the location where it is stored and other relevant data. In the context of the particular user interface disclosed in the previously identified application, this table is referred to as a namespace map, or "nmap".

Figure 1:
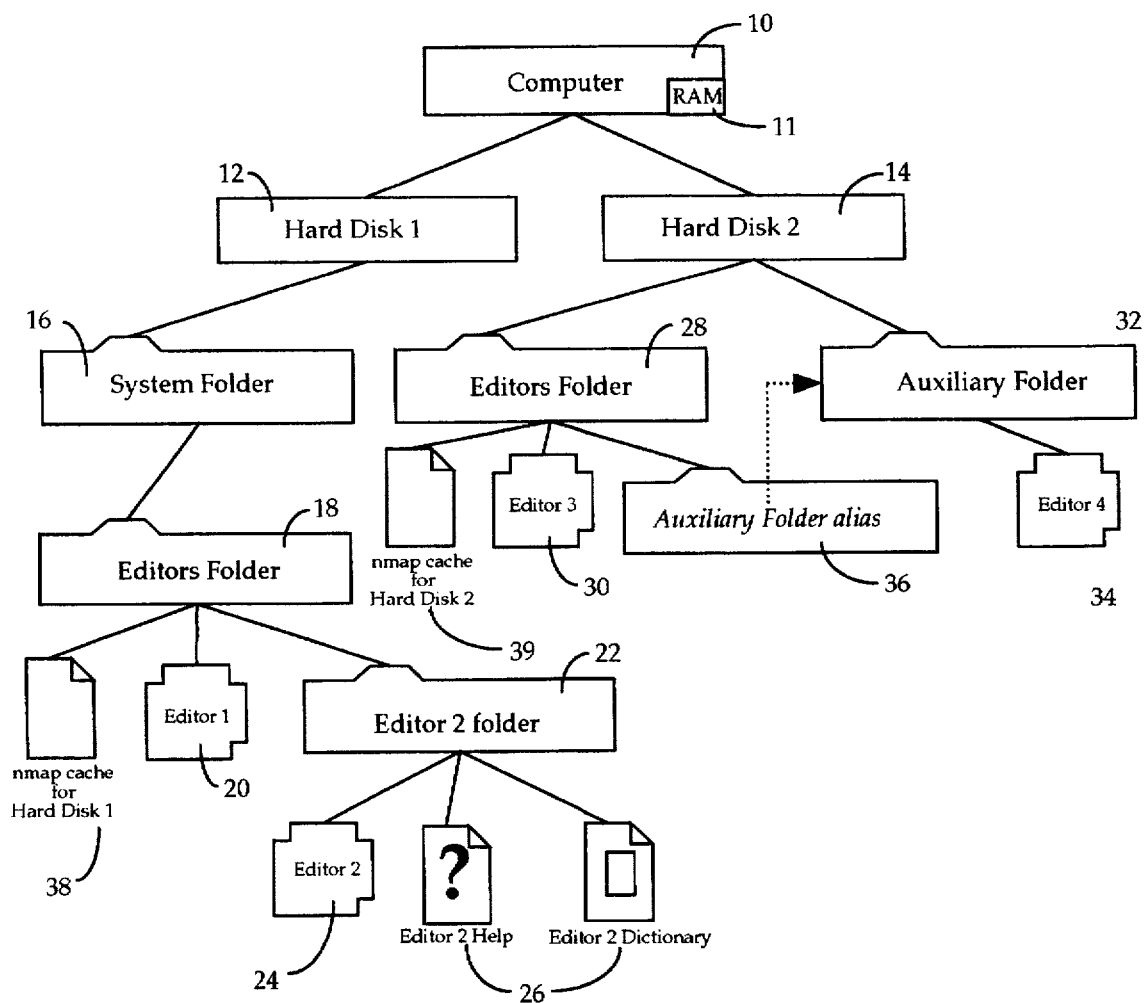
FIG. 1 is a block diagram illustrating an architecture for the storage of files in an exemplary computer system.

To construct the nmap, the user interface searches specific folders on each accessible storage medium to locate the available editors. FIG. 1 illustrates an exemplary file arrangement in a computer on which the user interface might be operating. Referring thereto, the computer 10 has access to two different permanent storage media, namely two hard disks 12 and 14. These hard disks might both be local to the computer, or one of them might be located at a remote site, for example on a file server to which the computer 10 is connected. The hard disk 12 contains a system folder 16 in which the operating system for the computer is stored. Part of the operating system may include the graphical user interface. The user interface is structured such that editors are located in designated folders. In this context, a "folder" is a data structure in a user interface which is capable of containing other components, such as files. Another known type of data structure which functions as a container is a directory. On the hard disk 12, an editors folder 18 is stored within the system folder 16. The editors folder 18 contains one editor 20. Also contained within the editors folder 18 is another editor folder 22, which contains a second editor 24 and other files 26 associated therewith.

The hard disk 14 also contains an editors folder 28, in which a third editor 30 is stored. Also contained on the hard disk 14 is an auxiliary folder 32 which contains a fourth editor 34. The editors folder 28 on the hard disk 14 includes an auxiliary folder alias 36. This alias is not a separate folder, but rather is a reference, e.g., a pointer, to the auxiliary folder 32. By accessing this alias, the user is linked to the auxiliary folder 32, and can thereby gain access to the editor 34 through the editors folder 28.

When the user interface is launched on the computer 10, it searches the accessible media to locate the editors. More particularly, it searches for editors folders. Upon locating the editors folder 18, the user interface examines its contents to locate the editor 20. Upon doing so, it also identifies the folder 22 and searches its contents to locate the editor 24. As the user interface identifies each editor, it stores information pertaining to the name and location of the editor. In addition, it examines the editor to obtain relevant data relating thereto. For example, to carry out the binding operation, the user interface must know whether a particular editor is a text editor, a graphics editor, or some other type of editor. Thus, as part of the routine for building the nmap table, the user interface searches each editor itself to obtain the relevant data that is to be stored in the table.

In accordance with the present invention, the need to examine every editor each time the user interface is launched can be reduced, by storing a cache file which contains the relevant data to be stored in the nmap table. In a preferred implementation, one cache file is stored on each storage volume, e.g., hard disk or other storage medium, that is accessible by the computer. In FIG. 1, two cache files 38 and 39 are respectively stored on the hard disks 12 and 14. As shown in the Figure, they can be located in the editors folders 18 and 28 for the respective hard disks.

The first time that an nmap table is built from a particular volume, an nmap cache file is simultaneously created and stored on the volume. Subsequently, whenever the table is to be built, the information contained in the cache file can be directly imported into the table, eliminating the need to search each editor for relevant data. This procedure is depicted in greater detail in the flow chart of FIG. 2. Referring thereto, when the user interface first launches, it obtains a list of the storage volumes that are accessible to the computer on which it is launching, at step 40. In the example of FIG. 1, the list identifies the two hard disks, 12 and 14. At step 42 a determination is made whether any of the volumes on the list are unexamined. During the first iteration of this process, of course, neither of the volumes will have been examined. Accordingly, one of the volumes, e.g., the hard disk 12, is selected at step 44, and a determination is made at step 46 whether this volume contains a cache file. If it does not, a new file is created at step 48, and the contents of the file are updated at step 50. Basically, in this step each of the folders in the volume is traversed, for example to determine whether it is an editors folder, and if so, the relevant information is obtained from it and stored in the cache file.

If a cache file is determined to already exist at step 46, a determination is made at step 52 whether any of the folders in the cache file have been modified since the last time that the file was updated. For this purpose, the cache filed contains an identification of each relevant folder on the volume, i.e., each folder that contains, or refers to, an editor, along with the last date preceding the creation of the cache file on which the contents of that folder were modified. This stored date is compared against the most recent modification date of the identified folder. If the dates match, there has been no modification subsequent to the creation of the cache file, and so the contents of the cache file are valid. If, however, there has been a more recent modification of one or more folders, a new cache file is created at step 48 and updated at step 50, as described previously.

Once the cache file has been updated, or if a determination is made that it is currently valid, its contents are loaded into an nmap table at step 54. This table might be stored in the main memory 11 of the computer 10, for example, so that it is readily accessible to the user interface. This procedure is repeated for each volume. Thus, after the process of FIG. 2 has run, there is a cache file stored on each volume which contains the current information regarding all of the editors that are accessible to the system. In addition, the information in each of the cache files is stored in the nmap table.

Figure 3:
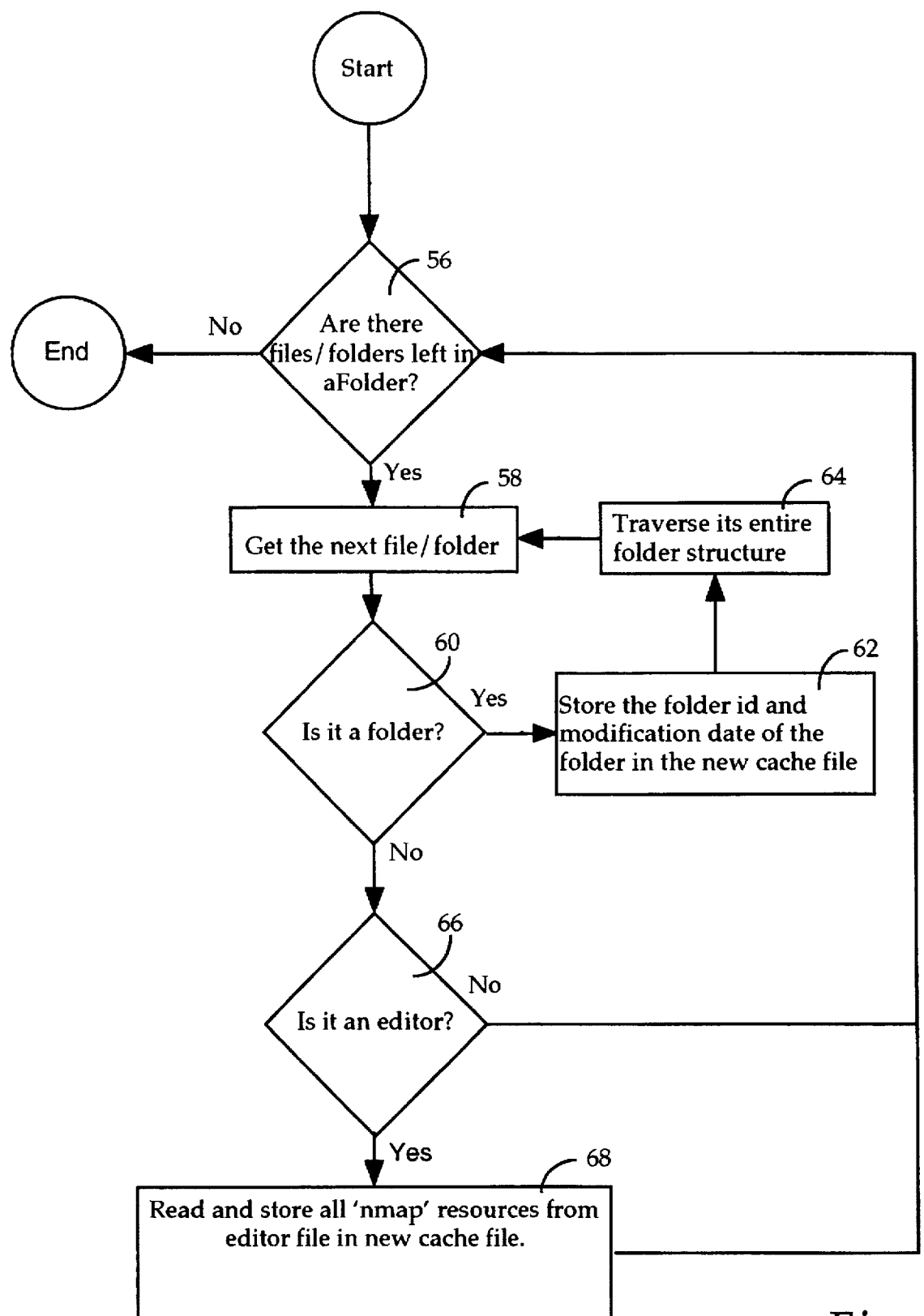
FIG. 3 is a flow chart of the process for constructing the cache file.

The routine carried out at step 50 is illustrated in greater detail in the flow chart of FIG. 3. Referring thereto, the volume currently being examined is searched to locate folders of interest, e.g., editor folders. In the example of FIG. 3, an editors folder which has been located is labeled "aFolder." At step 56 a determination is made whether any of the files or folders in the editors folder are unexamined. If there is an unexamined item, it is selected at step 58, and a determination is made at step 60 whether the selected item is a folder. If it is, the identification of the folder and its most recent modification date are stored in the cache file at step 62. Thereafter, at step 64, the contents of the folder are examined, and one of the items therein is selected at step 58. The procedure of steps 58–64 is repeated until all nested folders within the folder of interest have been identified. Eventually, a determination will be made at step 60 that a selected item is not a folder. At step 66, the selected item is examined to determine if it is an editor. If not, the process returns to step 56 to determine whether there are any other unexamined files or folders. If the selected item is an editor, all the necessary resources pertaining to that editor are obtained at step 68, and stored in the cache file. These resources might include, for example, the identification of the parent folder which contains the editor, its file name, its total data size, and all other relevant data to be stored in the nmap table. Once this data has been stored, the process returns to step 56, to continue with the examination of other items in an associated section 74 of the editors folder on the volume.

Figure 4:
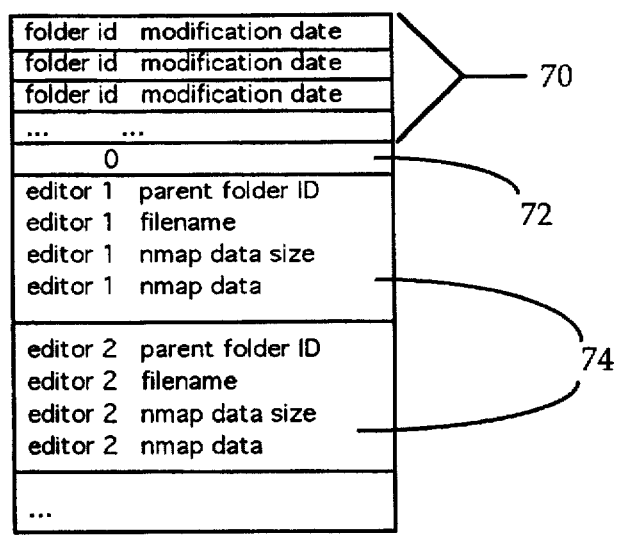
FIG. 4 is an exemplary format for the cache file.

FIG. 4 illustrates an exemplary format for the nmap cache file. The beginning of the file includes a section 70 that stores an identification of each folder on the volume that contains an editor, either directly or indirectly. Associated with each folder identification is its most recent modification date. At the end of all the folder identifications, a suitable break indicator 72 is placed in the file, e.g., a series of zeros. Thereafter, the relevant information pertaining to each editor, which is needed for the nmap table, is stored in an appropriate section 74 of the cache file.

In the example of FIG. 1, the editor 34 is not contained in an editors folder. As such, in the process in building the nmap table, if the user interface only searches for editors folders, it will not select the auxiliary folder 32 for examination. However, since the editors folder 28 contains a reference 36 to the auxiliary folder, this reference can be stored in the beginning portion of the nmap cache, along with the actual folder identifications. More preferably, the identification of the auxiliary folder 32 itself is stored, in place of the alias 36. In either event, the relevant information pertaining to the editor 34 is identified and stored in the nmap cache file.

Figure 2:
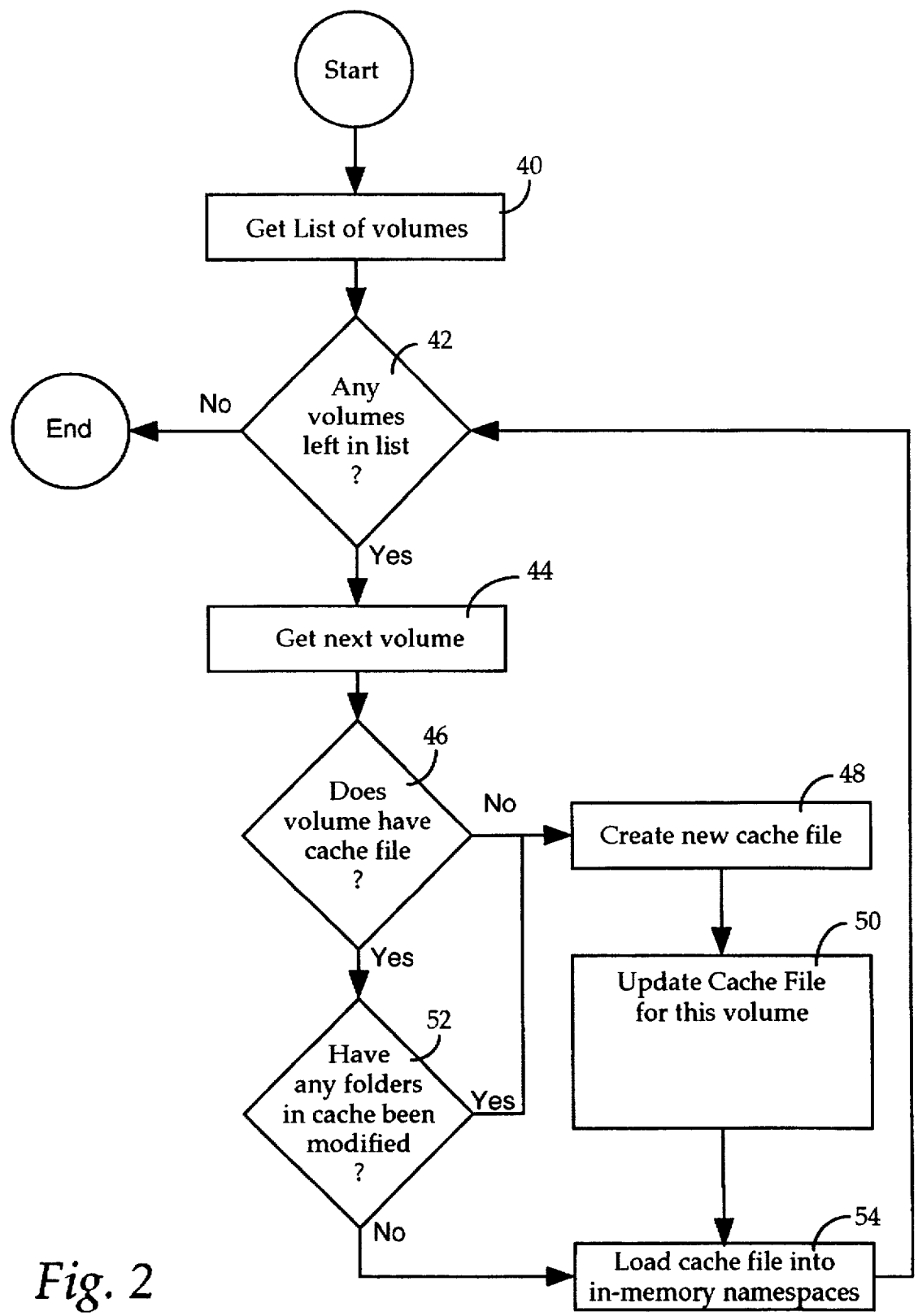
FIG. 2 is a flow chart of the general procedure that is carried out in accordance with the present invention to construct a resource table.

It may be the case that one or more of the accessible volumes has a read-only limitation placed on it. For example, its contents may have been locked by the creator of that volume. In such a case, the nmap cache file cannot be directly stored on the volume. However, it is still desirable to create and store an nmap cache file for the volume, to accelerate the table building process. In such a situation, the nmap cache file can be stored on a bootable storage medium, for example in the local system folder 16, or some other suitable location, where it is readily accessible by the user interface during the table building process. If the user interface encounters a read-only volume, it can search the system folder 16 or other designated location, to determine whether an nmap cache file has previously been created for that volume, and utilize it in the normal manner, as depicted in FIG. 2.

From the foregoing, it can be seen that the present invention provides a mechanism which accelerates the procedure for constructing resource tables. By storing relevant information pertaining to resources on a stored volume, in a cache file that is also on that volume, or otherwise associated with it, the need to examine each resource every time the table is constructed can be eliminated. Rather, examination of resources is only carried out when modifications have occurred and the contents of the cache file are no longer valid.

It will be appreciated by those of ordinary skill in the art that the present invention can be embodied in other specific forms without departing from the spirit or essential characteristics thereof. For example, although specifically disclosed in the context of building an nmap table for part editors in a graphical user interface, the principles of the invention are applicable to any situation in which the run-time construction of a table of resources is to be carried out. The presently disclosed embodiment is therefore considered, in all respects, to be illustrative and not restrictive. The scope of the invention is indicated by the appended claims, rather than the foregoing description, and all changes that come within the meaning and range of equivalents thereof are intended to be embraced therein.

What is claimed is:

1. A method for constructing a table of resources in a computer system, comprising the steps of:

searching at least a portion of a storage volume to identify resources of interest;

creating and storing on said storage volume a cache file for the storage volume;

storing in said cache file identifications of data structures which contain resources of interest and information indicating when the contents of each structure were last modified;

storing information pertaining to each identified resource of interest; and loading the contents of the cache file into a table of resources in a memory for the computer system.

2. The method of claim 1 wherein said computer system includes a plurality of storage volumes, and wherein a separate cache file is created for each storage volume.

3. The method of claim 1 wherein said data structures include folders.

4. The method of claim 1 wherein the information pertaining to each identified resource of interest includes an identification of a data structure which contains the resource.

5. A computer system, comprising:

a main memory into which an executing program is loaded;

at least one storage volume containing resources that are utilized by said executing program;

means for examining said storage volume and creating and storing on said storage volume a cache file containing information relating to said resources; and means for loading said cache file into a resource table stored in said main memory.

6. The computer system of claim 5 comprising at least two storage volumes, and wherein a respective cache file is stored on each storage volume.

7. The computer system of claim 5 wherein said cache file contains identifications of data structures on said storage volume which contain said resources, and information indicating when the contents of the data structures were last modified.

8. In a computer system, a method for reducing the time required to construct a resource table prior to launching an executable computer program, said method comprising the steps of:
- searching a storage volume to identify each resource that may be utilized in support of program execution;
- storing resource identification information in a cache file associated with the storage volume, wherein said resource identification information includes information identifying when each resource was last modified;
- prior to launching the executable program, comparing the resource identification information stored in the cache file with resource identification information stored in the associated storage volume;
- loading the contents of the cache file into the resource table if the modification time for each resource stored in the cache file is the same as the corresponding modification time stored in the associated storage volume;
- updating the cache file only if a modification time stored in the cache file differs from the corresponding modification time stored in the associated storage volume, then loading the contents of the cache file into the resource table; and
- launching the executable program.

9. A method in accordance with claim 8, wherein said cache file is stored on the associated storage volume.

10. A method in accordance with claim 8, wherein the cache file is stored on a secondary storage volume when the associated storage volume has a read-only capability.

11. A method in accordance with claim 10, wherein the secondary storage volume is a bootable storage volume.

12. A computer system comprising:
- a main memory into which an executable program is loaded;
- a storage volume containing resources that are utilized in support of program execution;
- means for examining the storage volume and for creating a corresponding cache file containing identification information relating to each resource stored in the storage volume, wherein said identification information includes information identifying when each resource was last modified;
- prior to launching the executable program, means for comparing the identification information stored in the cache file with identification information stored in the storage volume;
- means for loading the contents of the cache file into a resource table, located in the main memory, if for each resource the modification time stored in the cache file is the same as the corresponding modification time stored in the storage volume;
- means for updating the cache file only if a modification time stored in the cache file differs from the corresponding modification time stored in the storage volume, then loading the contents of the cache file into the resource table; and
- means for launching said executable program.

13. A computer system in accordance with claim 12, wherein said cache file is stored on the storage volume.

14. A computer system in accordance with claim 12, wherein the cache file is stored on a secondary volume when the storage volume has a read-only capability.

15. A computer system in accordance with claim 14, wherein the secondary volume is a bootable storage volume.

16. A method for constructing a table of resources in a computer system, comprising the steps of:
- searching at least a portion of a storage volume to identify resources of interest;
- creating a cache file for the storage volume;
- storing in said cache file identifications of data structures which contain resources of interest and information indicating when the contents of each structure were last modified;
- storing information pertaining to each identified resource of interest;
- loading the contents of the cache file into a table of resources in a memory for the computer system;
- determining when a data structure, whose identification is stored in said cache files, was last modified;
- comparing the determined modification time with the modification time stored in the cache file;
- loading the contents of the cache file into the table of resources when the compared times are the same; and
- creating a new cache file when the compared times are not the same.

17. A computer system, comprising:
- a main memory into which an executing program is loaded;
- at least one storage volume containing resources that are utilized by said executing program;
- means for examining said storage volume and creating a cache file containing identifications of data structures on said storage volume which contain said resources, and information indicating when the contents of the data structures were last modified;
- means for loading said cache file into a resource table stored in said main memory;
- means for examining said data structures to determine when they were last modified;
- means for determining whether the last modification of each data structure is the same as the indications stored in said cache file; and
- means for creating a new cache file if the last modification of a data structure is not the same as the indication stored in said cache file.

18. A method for storing a table of resources in the main memory of a computer system in connection with the launching of a program, comprising the steps of:
- searching at least a portion of a storage volume as part of the launching of a program to identify resources that support the execution of the program;
- creating a cache file for the storage volume;
- storing in said cache file identifications of data structures which contain said identified resources and information indicating when the contents of each structure were last modified;
- storing information pertaining to each identified resource; and
- loading the contents of the cache file into a table of resources in a memory for the computer system in lieu of said searching step during a subsequent launching of said program.

19. The method of claim 18 wherein said computer system includes a plurality of storage volumes, and wherein a separate cache file is created for each storage volume.

* * * * *